United States Patent
Lee et al.

(10) Patent No.: US 11,183,897 B2
(45) Date of Patent: Nov. 23, 2021

(54) STATOR OF ROTATING ELECTRIC APPARATUS

(71) Applicant: LG Magna e-Powertrain Co., Ltd., Incheon (KR)

(72) Inventors: Hyounggun Lee, Seoul (KR); Minjung Kim, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 156 days.

(21) Appl. No.: 16/606,890

(22) PCT Filed: Apr. 19, 2017

(86) PCT No.: PCT/KR2017/004203
§ 371 (c)(1),
(2) Date: Oct. 21, 2019

(87) PCT Pub. No.: WO2018/194194
PCT Pub. Date: Oct. 25, 2018

(65) Prior Publication Data
US 2020/0136457 A1   Apr. 30, 2020

(51) Int. Cl.
*H02K 3/48* (2006.01)
*H02K 1/16* (2006.01)
(Continued)

(52) U.S. Cl.
CPC ............... *H02K 3/48* (2013.01); *H02K 1/16* (2013.01); *H02K 3/12* (2013.01); *H02K 3/28* (2013.01)

(58) Field of Classification Search
CPC .. H02K 3/46; H02K 1/16; H02K 3/12; H02K 3/28
See application file for complete search history.

(56) References Cited

U.S. PATENT DOCUMENTS 6,211,594 B1    4/2001  Umeda et al.
9,166,451 B2 *  10/2015 Han .................. B60L 15/20
(Continued)

FOREIGN PATENT DOCUMENTS

CN       1665101       9/2005
CN      102668333      9/2012
(Continued)

OTHER PUBLICATIONS

Extended European Search Report in European Application No. 17906632.9, dated Oct. 26, 2020, 12 pages.
(Continued)

*Primary Examiner* — Robert W Horn
(74) *Attorney, Agent, or Firm* — Fish & Richardson P.C.

(57) ABSTRACT

A stator of a rotating electric apparatus is disclosed. The stator includes a stator core that defines a plurality of slots that are located a circumference of the stator core. The stator further includes a stator coil that includes a plurality of conductors electrically connected, located in the plurality of slots, and configured to conduct electricity. The stator coil includes a plurality of phase coils that are each connected to a phase of a power source. A first conductor of the stator coil is connected to a power line and is located in an nth layer that is an outermost layer of one of the plurality of slots. An Nth conductor of the stator coil is connected to a neutral line and is located in an n−1th layer that is located nearer to a center of the stator than the nth layer.

15 Claims, 18 Drawing Sheets

(51) Int. Cl.
*H02K 3/12* (2006.01)
*H02K 3/28* (2006.01)

(56) References Cited

U.S. PATENT DOCUMENTS

| | | | |
|---|---|---|---|
| 9,735,641 B2* | 8/2017 | Sakaue | H02K 15/105 |
| 9,906,085 B2* | 2/2018 | Nakamura | H02K 3/50 |
| 10,263,484 B2* | 4/2019 | Mizutani | H02K 3/50 |
| 10,439,461 B2* | 10/2019 | Matahira | H02K 3/50 |
| 10,505,424 B2* | 12/2019 | Tamura | H02K 3/04 |
| 10,530,201 B2* | 1/2020 | Akimoto | H02K 1/16 |
| 10,547,223 B2* | 1/2020 | Ishigami | H02K 1/146 |
| 10,658,897 B2* | 5/2020 | Lee | H02K 3/12 |
| 10,916,985 B2* | 2/2021 | Vaubel | H02K 1/16 |
| 10,916,986 B2* | 2/2021 | Fukuda | H02K 3/28 |
| 2005/0006979 A1 | 1/2005 | Neet | |
| 2009/0179530 A1 | 7/2009 | Neet | |
| 2011/0012471 A1 | 1/2011 | Dang et al. | |
| 2013/0147306 A1 | 6/2013 | Trammell et al. | |
| 2014/0021823 A1* | 1/2014 | Kitamura | H02K 15/066 310/208 |
| 2014/0319953 A1 | 10/2014 | Rahman et al. | |
| 2015/0022046 A1* | 1/2015 | Shibata | H02K 3/12 310/208 |
| 2019/0363620 A1* | 11/2019 | Wang | H02K 15/10 |
| 2019/0386533 A1* | 12/2019 | Lee | H02K 3/28 |
| 2020/0235622 A1* | 7/2020 | Tian | H02K 1/16 |
| 2020/0395804 A1* | 12/2020 | Ahmed | H02K 1/16 |

FOREIGN PATENT DOCUMENTS

| | | |
|---|---|---|
| CN | 103339834 | 10/2013 |
| CN | 103580403 | 2/2014 |
| CN | 104300716 | 1/2015 |
| CN | 105680600 | 6/2016 |
| EP | 2665158 | 11/2013 |
| EP | 3029810 | 6/2016 |
| JP | 2001211587 | 8/2001 |
| JP | 2007267570 | 10/2007 |
| JP | 2010074889 | 4/2010 |
| JP | 2014217136 | 11/2014 |
| JP | 2016032392 | 3/2016 |
| KR | 20080068437 | 7/2008 |

OTHER PUBLICATIONS

Chinese Office Action in Chinese Application No. 201780089782.2, dated Nov. 27, 2020, 15 pages (with English translation).

* cited by examiner

FIG. 17

| Slot | 8 | 7 | 6 | 5 | 4 | 3 | 2 | 1 | | Slot | 8 | 7 | 6 | 5 | 4 | 3 | 2 | 1 |
|---|---|---|---|---|---|---|---|---|---|---|---|---|---|---|---|---|---|---|
| 43 | - | 50U | 64U | 6U | 12U | 52U | 62U | 8U | 10U | 22 | + | 17W | 19W | 29W | 39W | 15W | 21W | 27W | 41W |
| 44 | - | 50U | 64U | 6U | 12U | 52U | 62U | 8U | 10U | 23 | - | 18V | 32V | 38V | 44V | 20V | 30V | 40V | 42V |
| 45 | + | 49W | 51W | 61W | 7W | 47W | 53W | 59W | 9W | 24 | + | 18V | 32V | 38V | 44V | 20V | 30V | 40V | 42V |
| 46 | + | 49W | 51W | 61W | 7W | 47W | 53W | 59W | 9W | 25 | + | 33U | 35U | 45U | 55U | 31U | 37U | 43U | 57U |
| 47 | - | 50V | 64V | 6V | 12V | 52V | 62V | 8V | 10V | 26 | + | 33U | 35U | 45U | 55U | 31U | 37U | 43U | 57U |
| 48 | - | 50V | 64V | 6V | 12V | 52V | 62V | 8V | 10V | 27 | - | 18W | 32W | 38W | 44W | 20W | 30W | 40W | 42W |
| 1 | + | 1U | 3U | 13U | 23U | 63U | 5U | 11U | 25U | 28 | - | 18W | 32W | 38W | 44W | 20W | 30W | 40W | 42W |
| 2 | + | 1U | 3U | 13U | 23U | 63U | 5U | 11U | 25U | 29 | + | 33V | 35V | 45V | 55V | 31V | 37V | 43V | 57V |
| 3 | + | 50W | 64W | 6W | 12W | 52W | 62W | 8W | 10W | 30 | + | 33V | 35V | 45V | 55V | 31V | 37V | 43V | 57V |
| 4 | - | 50W | 64W | 6W | 12W | 52W | 62W | 8W | 10W | 31 | - | 34U | 48U | 54U | 60U | 36U | 46U | 56U | 58U |
| 5 | - | 1V | 3V | 13V | 23V | 63V | 5V | 11V | 25V | 32 | - | 34U | 48U | 54U | 60U | 36U | 46U | 56U | 58U |
| 6 | + | 1V | 3V | 13V | 23V | 63V | 5V | 11V | 25V | 33 | + | 33W | 35W | 45W | 55W | 31W | 37W | 43W | 57W |
| 7 | - | 2U | 16U | 22U | 28U | 4U | 14U | 24U | 26U | 34 | + | 33W | 35W | 45W | 55W | 31W | 37W | 43W | 57W |
| 8 | - | 2U | 16U | 22U | 28U | 4U | 14U | 24U | 26U | 35 | - | 34V | 48V | 54V | 60V | 36V | 46V | 56V | 58V |
| 9 | + | 1W | 3W | 15W | 23W | 63W | 5W | 11W | 25W | 36 | - | 34V | 48V | 54V | 60V | 36V | 46V | 56V | 58V |
| 10 | + | 1W | 3W | 15W | 23W | 63W | 5W | 11W | 25W | 37 | + | 49U | 51U | 61U | 7U | 47U | 53U | 59U | 9U |
| 11 | - | 2V | 16V | 22V | 28V | 4V | 14V | 24V | 26V | 38 | + | 49U | 51U | 61U | 7U | 47U | 53U | 59U | 9U |
| 12 | - | 2V | 16V | 22V | 28V | 4V | 14V | 24V | 26V | 39 | - | 34W | 48W | 54W | 60W | 36W | 46W | 56W | 58W |
| 13 | + | 17U | 19U | 29U | 39U | 15U | 21U | 27U | 41U | 40 | - | 34W | 48W | 54W | 60W | 36W | 46W | 56W | 58W |
| 14 | + | 17U | 19U | 29U | 39U | 15U | 21U | 27U | 41U | 41 | + | 49V | 51V | 61V | 7V | 47V | 53V | 59V | 9V |
| 15 | - | 2W | 16W | 22W | 28W | 4W | 14W | 24W | 26W | 42 | + | 49V | 51V | 61V | 7V | 47V | 53V | 59V | 9V |
| 16 | - | 2W | 16W | 22W | 28W | 4W | 14W | 24W | 26W | 43 | - | 50U | 64U | 6U | 12U | 52U | 62U | 8U | 10U |
| 17 | + | 17V | 19V | 29V | 39V | 15V | 21V | 27V | 41V | 44 | - | 50U | 64U | 6U | 12U | 52U | 62U | 8U | 10U |
| 18 | + | 17V | 19V | 29V | 39V | 15V | 21V | 27V | 41V | 45 | + | 49W | 51W | 61W | 7W | 47W | 53W | 59W | 9W |
| 19 | - | 18U | 32U | 38U | 44U | 20U | 30U | 40U | 42U | 46 | + | 49W | 51W | 61W | 7W | 47W | 53W | 59W | 9W |
| 20 | - | 18U | 32U | 38U | 44U | 20U | 30U | 40U | 42U | 47 | - | 50V | 64V | 6V | 12V | 52V | 62V | 8V | 10V |
| 21 | + | 17W | 19W | 29W | 39W | 15W | 21W | 27W | 41W | 48 | - | 50V | 64V | 6V | 12V | 52V | 62V | 8V | 10V |

STATOR OF ROTATING ELECTRIC APPARATUS

CROSS-REFERENCE TO RELATED APPLICATION

This application is a National Stage application under 35 U.S.C. § 371 of International Application No. PCT/KR2017/004203, filed on Apr. 19, 2017, which is incorporated by reference.

FIELD

The present disclosure relates to a stator of a rotating electric apparatus.

BACKGROUND

As is well known, a rotating electric apparatus (or a rotary electric machine) includes a stator and a rotor disposed to be rotatable relative to the stator.

The stator includes a stator core having a plurality of slots, and a stator coil wound around the stator core.

The rotor is configured to be rotated by the stator and electromagnetic force or by external power.

A part of the stator coil is provided with conductors made of rectangular copper wires in order to increase a fill factor ratio (space factor) for the slots.

The stator coil is configured by connecting a plurality of conductors, which is inserted into the plurality of slots, in a unique pattern.

SUMMARY

In the stator of the related art rotary electric machine, connection portions of the conductors are spaced apart by relatively far distances along a circumferential direction of the stator core, depending on the connection pattern of the conductors of the stator coil. Accordingly, uniquely manufactured connection components (connection rings) have to be used for connection. This causes a problem of the increase in the number of components and a manufacturing cost.

In addition, there is a problem that the connection rings increase the axial length of the stator (or the end-turn height of the stator coil).

In addition, a separate connection conductor (jump wire) is additionally required for connection with the connection rings, thereby increasing the number of components and increasing the number of points to be welded.

In addition, depending on the connection pattern of the stator coil, the conductors protrude to outside of the stator along a radial direction of the stator core. Accordingly, an accommodating portion which protrudes along the radial direction of the stator core is formed in a case in which the stator is accommodated. This causes difficulty in manufacturing and installing the case.

Therefore, one aspect of the present disclosure is to provide a stator of a rotating electric apparatus (or rotary electric machine), capable of excluding use of connection rings and jump wires.

Another aspect of the present disclosure is to provide a stator of a rotating electric apparatus, capable of enhancing output density by reducing alternating current (AC) resistance of a stator coil.

Still another aspect of the present disclosure is to provide a stator of a rotating electric apparatus, capable of reducing the number of components to be provided and also reducing a fabricating cost.

Still another aspect of the present disclosure is to provide a stator of a rotating electric apparatus, capable of reducing a size of a stator in a radial direction and an axial direction of the stator.

According to an innovative aspect of the subject matter described in this specification, a stator of a rotating electric apparatus includes a stator core that defines a plurality of slots that are located a circumference of the stator core; and a stator coil that includes a plurality of conductors that are electrically connected, that are located in the plurality of slots, and that is configured to conduct electricity. The stator coil includes a plurality of phase coils that are each connected to a phase of a power source. A first conductor of the stator coil is connected to a power line and is located in an nth layer that is an outermost layer of one of the plurality of slots. An Nth conductor of the stator coil is connected to a neutral line and is located in an n−1th layer that is located nearer to a center of the stator than the nth layer. Ends of the conductors that are located inside each slot of the plurality of slots are welded together.

This and other implementations may include one or more of the following optional features. Each conductor of the plurality of phase coils is configured in a two-line integral form. Each phase coil of the plurality of phase coils includes a first partial phase coil and a second partial phase coil connected to each other in parallel. The first partial phase coil and the second partial phase coil are spaced apart from each other by one slot pitch along the circumference of the stator core. A conductor, connected to the power line, of each of the first partial phase coil and the second partial phase coil includes (i) a horizontal bent section that is bent along a radial direction of the stator core, and (ii) a vertical bent section that is bent from the horizontal bent section and that extends in an axial direction. The vertical bent section is located closer to a center of the stator core than an outer edge of the stator core and is oriented along the radial direction of the stator core. Each phase coil of the plurality of phase coils includes a first phase coil, a second phase coil, and a third phase coil.

The neutral line is located at an inner side of the vertical bent section along the radial direction of the stator core. The neutral line includes (i) three conductor contact portions that contact respective conductors of the plurality of phase coils and (ii) two connecting portions that each connect to one of two conductor contact portions that are adjacent to each other. The connecting portions protrude externally from the conductor contact portions along the radial direction of the stator core. The first conductor and the Nth conductor of each phase coil of the plurality of phase coils are connected to the neutral line and are spaced apart from each other by six slot pitches. Welded portions of the neutral line and the conductors are coated with an insulating material. Each of the plurality of phase coils includes a plurality of segment conductors that each include a first insertion portion and a second insertion portion that are located in the plurality of slots and that are spaced apart from each other by six slot pitches; a connecting portion that electrically connects a first end of the first insertion portion to a first end of the second insertion portion; and two extension portions extending from second ends of a respective one of the first and second insertion portions by a length corresponding to three slot pitches.

Each of the plurality of phase coils includes a plurality of unit patterns spaced apart from one another along the circumference of the stator core and connected in series. The plurality of unit patterns includes the first conductor to an mth conductor that are spaced apart by six slot pitches and connected in series. The first conductor of a first unit pattern of the plurality of unit patterns is connected to the power line. The first conductor of each of a second unit pattern to a last unit pattern of the plurality of unit patterns is connected to the mth conductor, which is a last conductor of a preceding unit pattern. The last mth conductor of the last unit pattern of the plurality of unit patterns is connected to the neutral line. The plurality of slots includes eight respective layers along the radial direction of the stator core. Each of the plurality of unit patterns includes the first conductor and second to sixteenth conductors.

For each of the plurality of unit patterns: the first conductor is located on an eighth layer in any one of the plurality of slots, a second conductor is located on an eighth layer in a slot spaced apart from the first conductor in a first direction, a third conductor is located on a seventh layer in the first conductor, a fourth conductor is located on a fourth layer in the second conductor, a fifth conductor is located on a third layer in the first conductor, a sixth conductor is located on a sixth layer in a slot spaced apart from the fifth conductor in a second direction opposite to the first direction, a seventh conductor is located on a fifth layer in a slot spaced apart from the sixth conductor in the second direction, an eighth conductor is located on a second layer in the sixth conductor, a ninth conductor is located on a first layer in the seventh conductor, a tenth conductor is located on a first layer in the eighth conductor, an eleventh conductor is located on a second layer in the first conductor, a twelfth conductor is located on a fifth layer in the sixth conductor, a thirteenth conductor is located on a sixth layer in the first conductor, a fourteenth conductor is located on a third layer in the second conductor, a fifteenth conductor is located on a fourth layer in a slot spaced apart from the fourteenth conductor in the first direction, and a sixteenth conductor is located on a seventh layer in the second conductor. The plurality of unit patterns is spaced apart from each another by twelve slot pitches in the first direction. The stator further includes 48 slots in the plurality of slots; and 4 unit patterns in the plurality of unit patterns.

As described above, according to an implementation of the present disclosure, a stator coil includes a plurality of phase coils, and a first conductor connected to a power line of each of the plurality of phase coils is disposed on an outermost $n^{th}$ layer of a slot, an $N^{th}$ conductor connected to a neutral line of each of the plurality of phase coils is disposed on an $n-1^{th}$ layer in a slot, and end portions of the other conductors are welded to one another without using jump lines, thereby eliminating the use of connection rings.

This may result in suppressing an increase in size of a stator in an axial direction of the stator.

By virtue of the elimination of the use of the connection rings, the number of components to be used can be reduced and the use of separate jump lines for connecting the connection rings can be eliminated.

This may result in reducing the number of components to be used and also reducing a manufacturing cost.

In addition, the plurality of phase coils can be configured by adjusting the order of conductors and welding end portions of the conductors to allow currents to flow, without using jump lines, thereby eliminating the use of the jump lines.

This may result in remarkably reducing the number of components to be used and further reducing the manufacturing cost.

In addition, by configuring each conductor of the plurality of phase coils of the stator coil in a two-line integral form, alternating current (AC) resistance can be reduced in a high-speed rotation (operation) region, thereby improving output density.

In addition, each of the plurality of phase coils of the stator coil is provided with a first partial phase coil and a second partial phase coil connected in parallel to each other, thereby increasing the number of turns.

A power line and a neutral line of the stator coil is disposed at an inner side of an outer surface (outer edge) in a radial direction of the stator core, thereby preventing an increase in the size of the stator in the radial direction.

In addition, the number of components can be reduced by suppressing the use of the connection rings and the jump lines, and the increase in the size of the stator in the axial direction and the radial direction can be suppressed, which is suitable for miniaturizing (downsizing) the stator.

BRIEF DESCRIPTION OF THE DRAWINGS

FIG. 17 illustrates a state where each conductor of the first phase coil, the second phase coil, and the third phase coil of a bottom perspective view of an example stator of a rotating electric apparatus or rotary electric machine is inserted into a corresponding slot.

DETAILED DESCRIPTION

Figure 1:
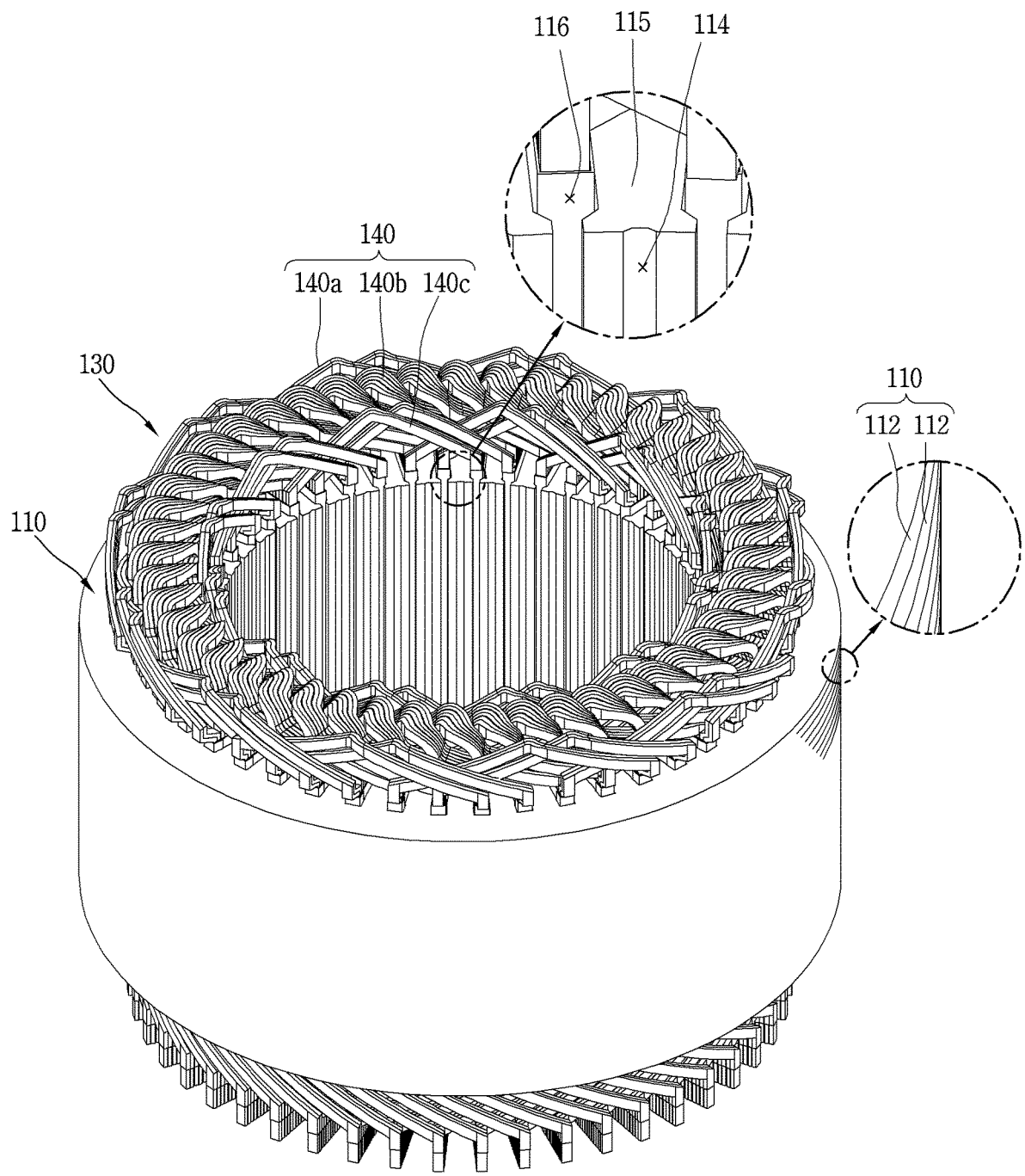
FIG. 1 is a perspective view of an example stator of a rotating electric apparatus or rotary electric machine.
Figure 2:
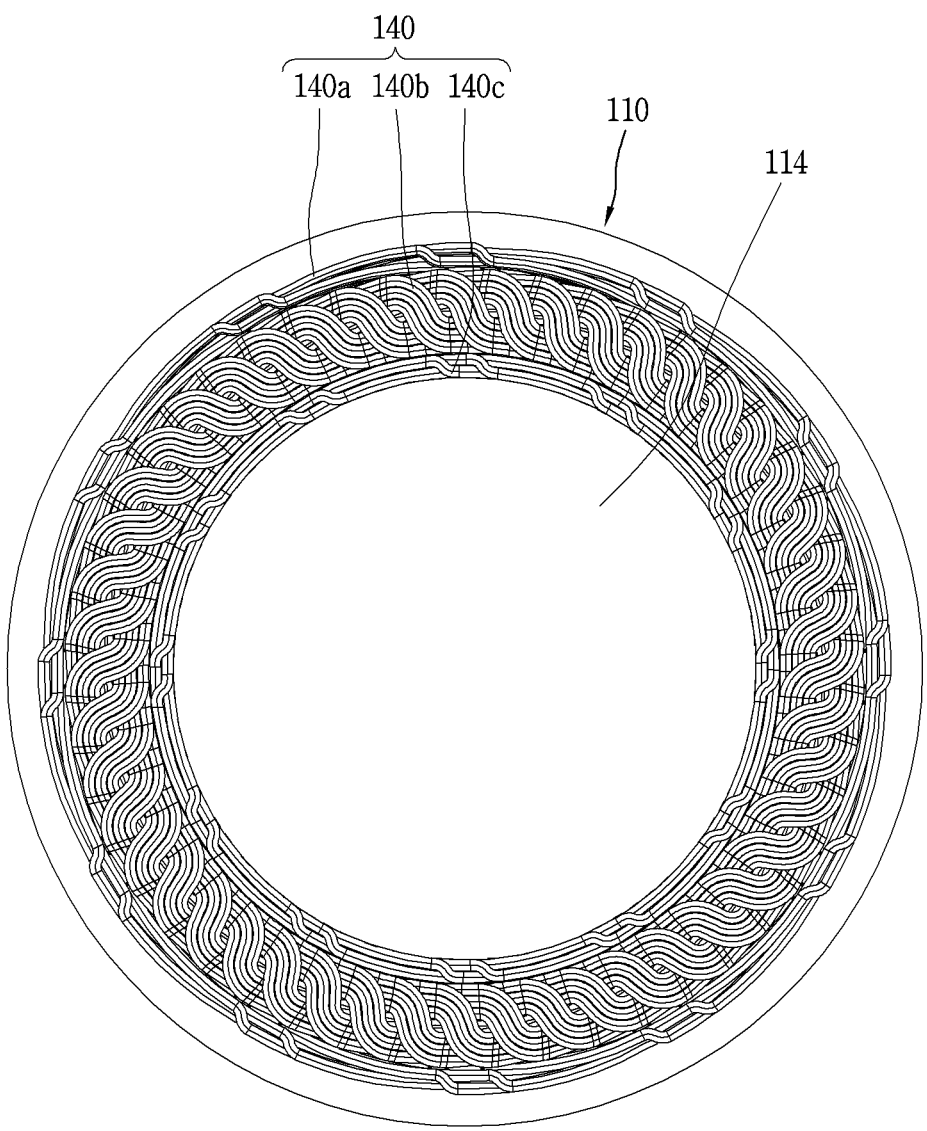
FIG. 2 is a planar view of an example stator of a rotating electric apparatus or rotary electric machine.

FIG. 1 is a perspective view of a stator of a rotating electric apparatus or rotary electric machine; FIG. 2 is a planar view of FIG. 1, and FIG. 3 is a bottom perspective view of FIG. 1.

Figure 3:
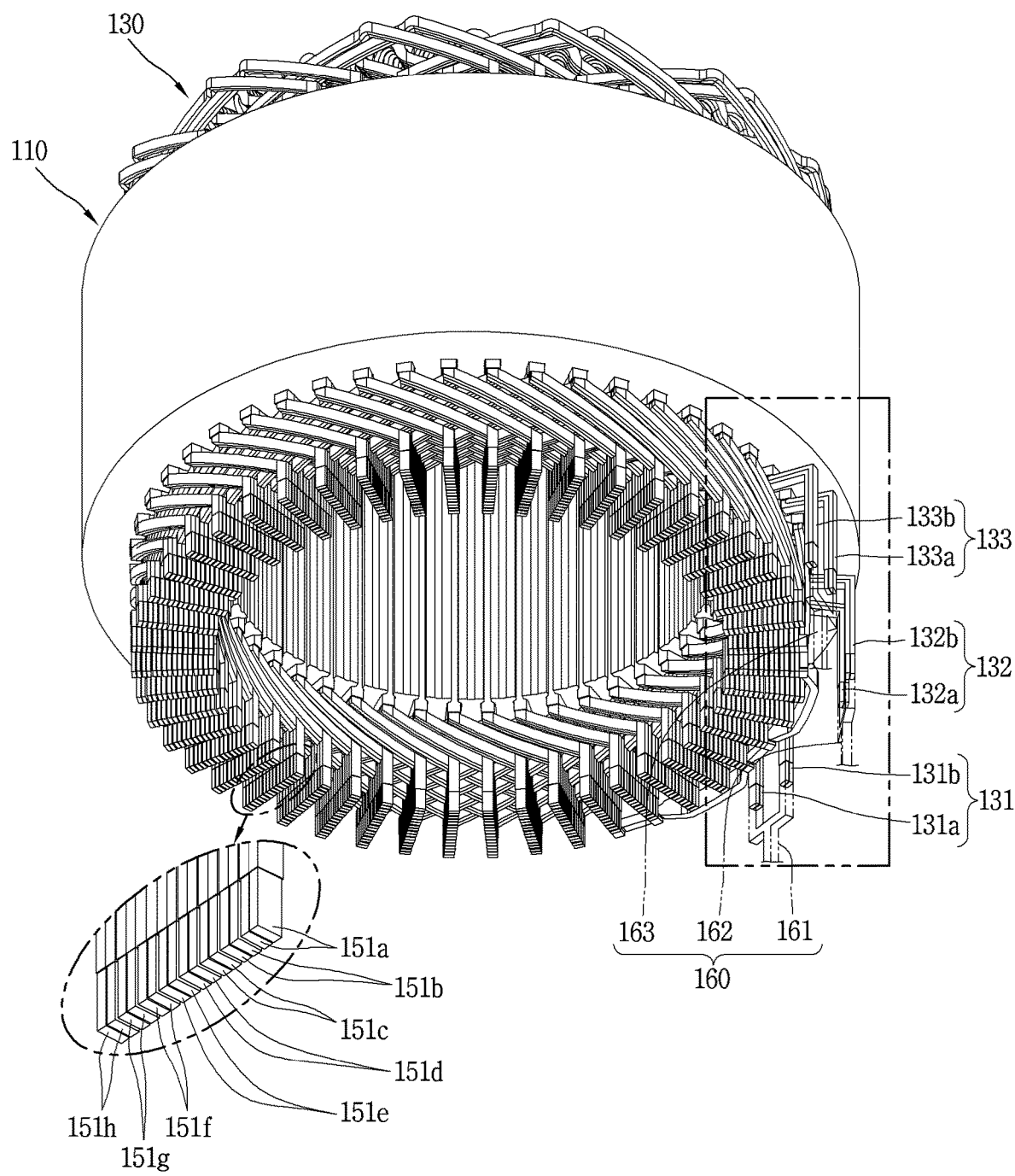
FIG. 3 is a bottom perspective view of an example stator of a rotating electric apparatus or rotary electric machine.

As illustrated in FIGS. 1 to 3, a stator of a rotary electric machine, or rotating electric apparatus, includes a stator core 110 having a plurality of slots 116 formed in a circumferential direction, and a stator coil 130 formed by connecting a plurality of conductors 140 inserted into the plurality of slots 116 so that a current can flow. The stator coil 130 includes a plurality of phase coils connected to phases of a power source, respectively. Each of the plurality of phase coils is configured such that a first conductor connected to a power line 160 is disposed on the outermost $n^{th}$ layer of one of the plurality of slots 116, and an $N^{th}$ conductor which is an $N^{th}$ conductor connected to a neutral line 170 is disposed on an n–$1^{th}$ layer located inward from the $n^{th}$ layer. Each of the plurality of phase coils is configured such that end portions of the conductors inside the plurality of slots 116 are connected in a welding manner.

The stator core 110 may include, for example, a rotor receiving hole 114 in which the rotor is received.

The stator core 110, for example, may be formed in a cylindrical shape.

The stator core 110, for example, may be formed by stacking in an insulating manner a plurality of electrical steel sheets 112 each having the rotor receiving hole 114 in a center thereof.

Each of the plurality of electrical steel sheets 112 may have, for example, a disc shape.

The stator core 110 may be provided with a plurality of slots 116 form on a circumference of the rotor receiving hole 114.

The stator core 110 may be provided with a plurality of poles 115 formed on the circumference of the rotor receiving hole 114 in an alternating manner with the plurality of slots 116.

The plurality of slots 116 may be, for example, 48 in number.

The plurality of poles 115 may be, for example, 48 in number.

This implementation illustrates the case where the plurality of slots 116 and poles 115 are 48 in number, respectively, but this is merely illustrative. The number of slots 116 and slots 115 may alternatively be 72 or may be adjusted appropriately.

The plurality of conductors 140 may be inserted into the plurality of slots 116, respectively.

The plurality of conductors 140 in the slots 116 may be disposed to have, for example, first to eighth layers 151a to 151h.

The stator coil 130 may be configured by connecting the plurality of conductors 140 into a preset pattern.

The stator coil 130 may include, for example, a plurality of phase coils connected to phases of the power source, respectively.

The plurality of phase coils may include, for example, a first phase coil (U-phase coil) 131, a second phase coil (V-phase coil) 132, and a third phase coil (W-phase coil) 133.

The plurality of phase coils may include, for example, first partial phase coils and second partial phase coils connected in parallel with each other.

The first partial phase coils may include, for example, a first partial U-phase coil 131a, a first partial V-phase coil 132a, and a first partial W-phase coil 133a.

The second partial phase coils may include, for example, a second partial U-phase coil 131b, a second partial V-phase coil 132b, and a second partial W-phase coil 133b.

The second phase coil 132 may be spaced apart from the first phase coil 131 by 4 slot pitches in a first direction, for example.

Here, the first direction refers to a rightward or counterclockwise direction in the drawing along the circumferential direction of the stator core 110.

A second direction opposite to the first direction refers to a leftward or clockwise direction in the drawing along the circumferential direction of the stator core 110.

In addition, the slot pitch, or slot pitch interval, refers to a distance or interval between two conductors inserted into the slots 116 of the stator core 110, and one slot pitch refers to a distance between two conductors inserted into two continuous (neighboring) slots 116, respectively.

The 4 slot pitches refer to a distance between one of the two conductors inserted into a first slot and the other inserted into a fifth slot, which is a fourth slot from the first slot.

The third phase coil 133 may be spaced apart from the second phase coil 132 by the 4 slot pitches in the first direction.

The third phase coil 133 may be spaced apart from the first phase coil 131 by 8 slot pitches in the first direction.

One end portion of each of the plurality of phase coils may be connected to the power line 160 (lead wire).

The power line 160 connected to the one end portion of each of the plurality of phase coils may be connected to each phase of a commercial power source, so that commercial power (AC power) can be supplied to the plurality of phase coils.

Another end portion of each of the plurality of phase coils may be connected to a neutral line 170 (neutral point).

Each of the plurality of phase coils includes a first conductor, which is the first conductor connected with the power line 160, and an Nth conductor, which is the last conductor connected with the neutral line 170.

The first conductor and the Nth conductor of each of the plurality of phase coils may be disposed in a spacing manner by 6 slot pitches along the circumferential direction of the stator core 110.

Each of the plurality of phase coils may be provided with a plurality of segment conductors 140 for convenience of manufacturing.

The plurality of segment conductors 140 may include, for example, a first segment conductor 140a disposed on an outermost side in the plurality of slots 116, a second segment conductor 140b disposed inward from the first segment conductor 140a, and a third segment conductor 140c disposed on an innermost side (first layer) in the plurality of slots 116.

The plurality of segment conductors 140 may be configured in a two-line integral form.

Here, the two-line integral means that two segment conductors 140 having substantially the same shape and size overlap each other to be in surface contact with each other so that the two segment conductors 140 are simultaneously bent, inserted, twisted, and welded.

As a result, an increase in electric resistance caused due to a skin effect of each segment conductor 140 can be prevented during a high-speed operation, thereby improving output density.

Figure 4:
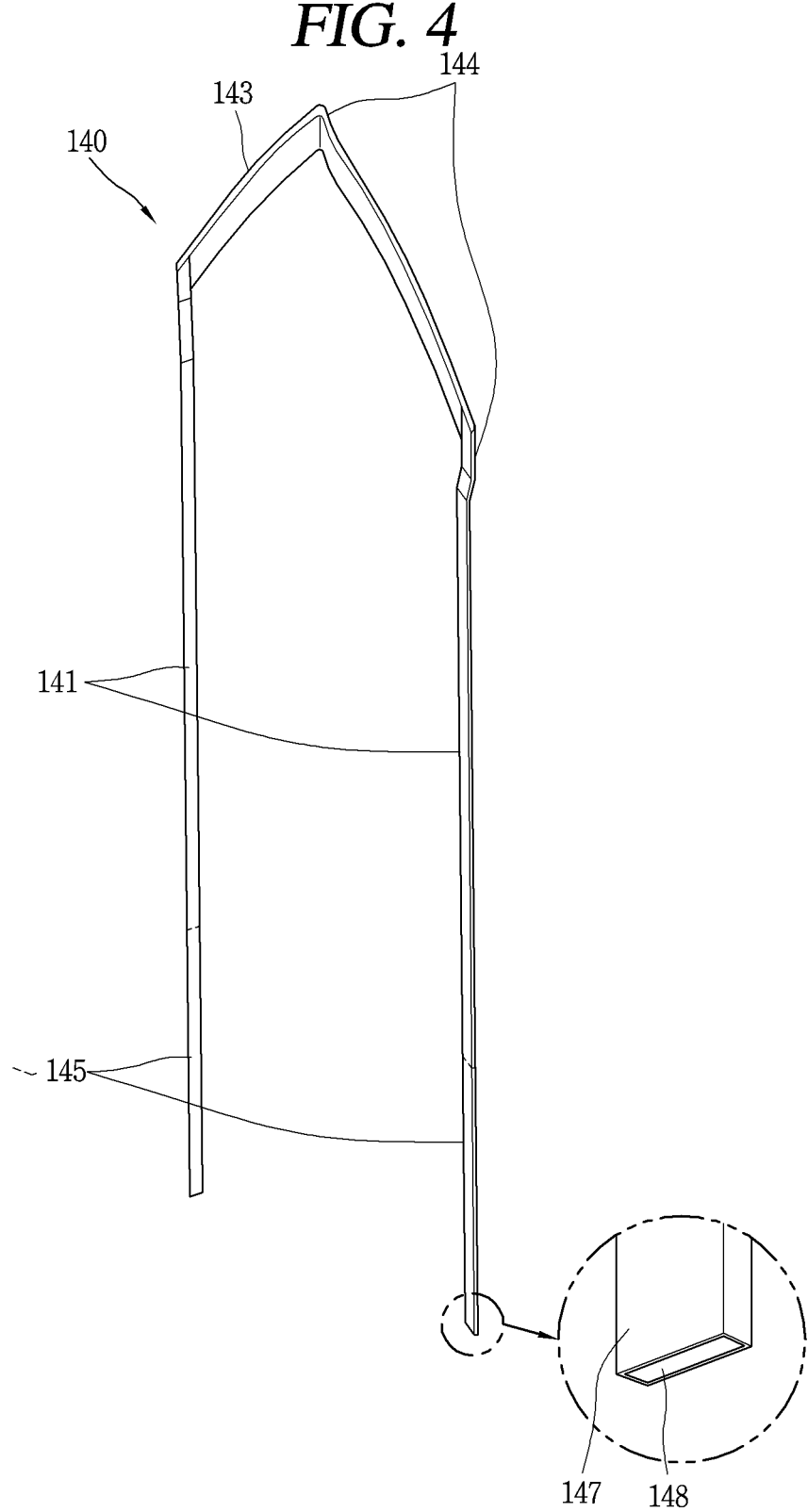
FIG. 4 illustrates an example state before bending an extension portion of a segment conductor of an example stator of a rotating electric apparatus or rotary electric machine.
Figure 5:
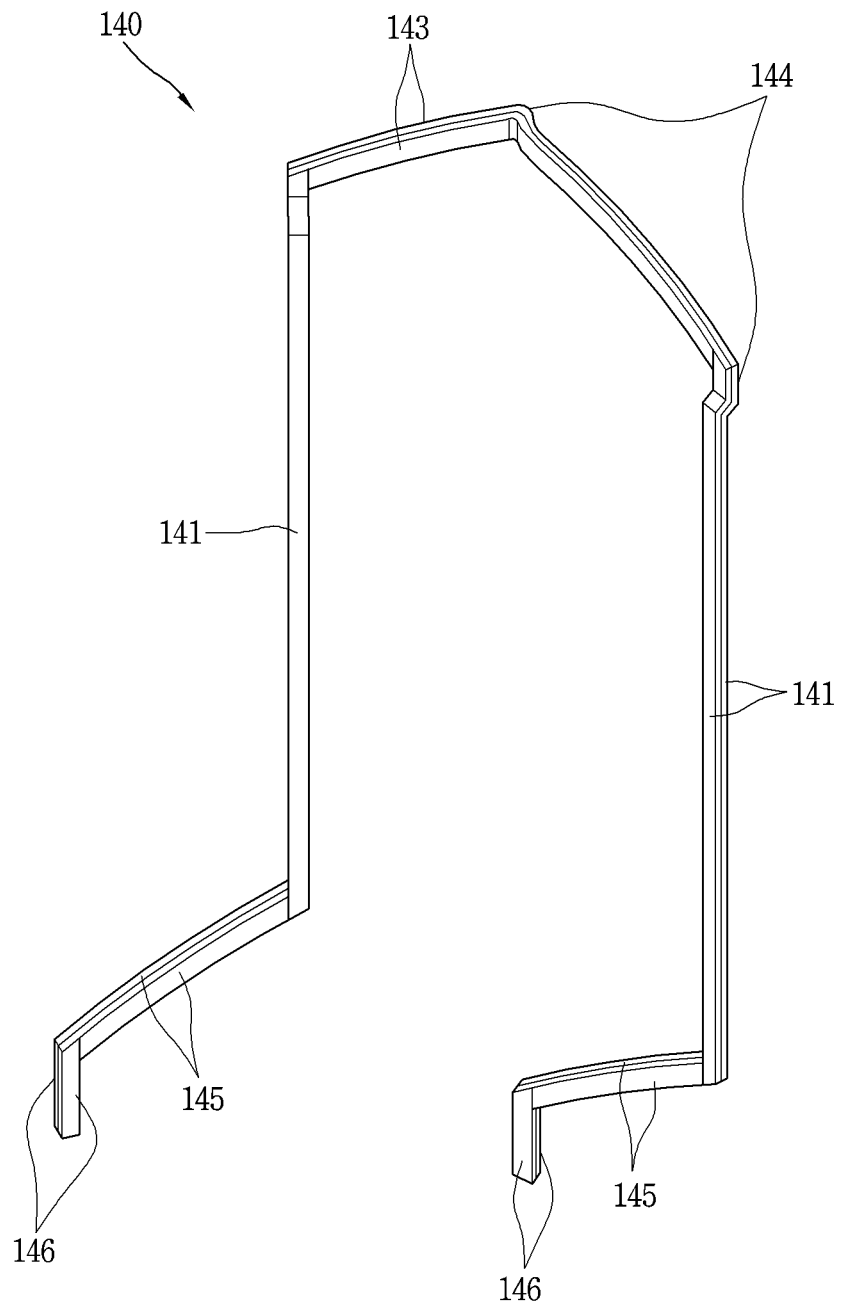
FIG. 5 illustrates an example first segment conductor of an example stator of a rotating electric apparatus or rotary electric machine.
Figure 6:
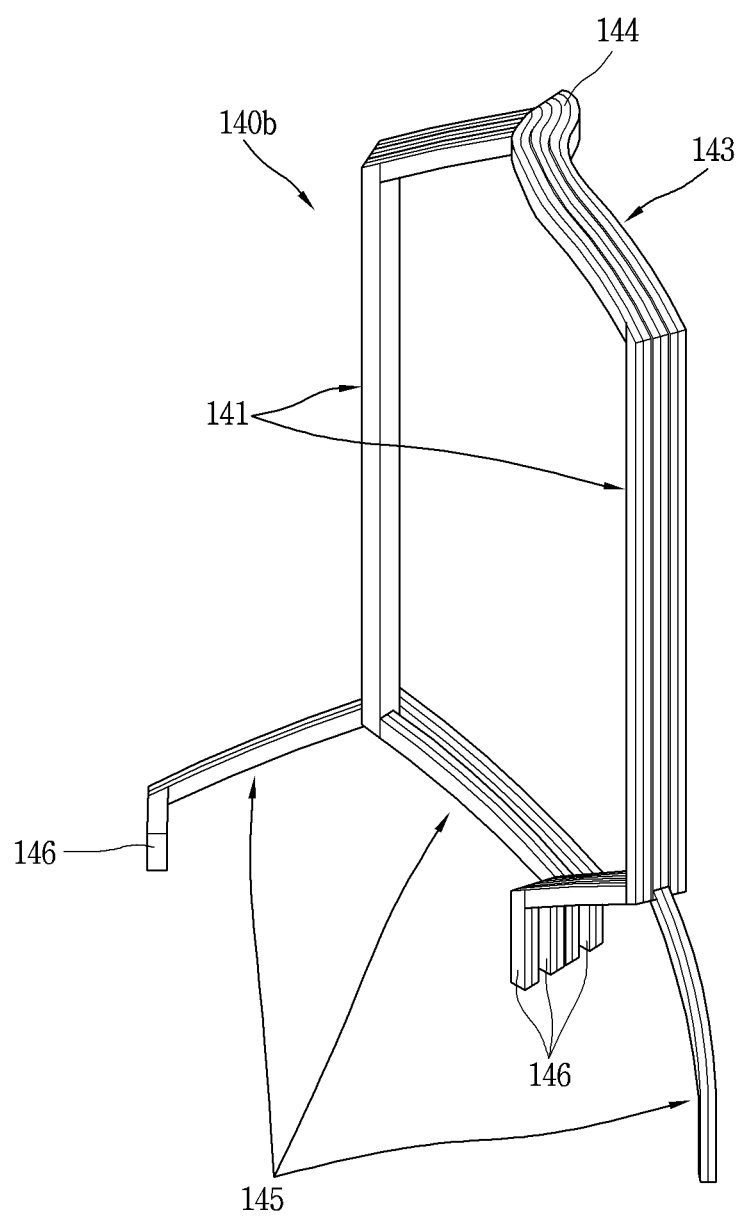
FIG. 6 illustrates an example second segment conductor of an example stator of a rotating electric apparatus or rotary electric machine.
Figure 7:
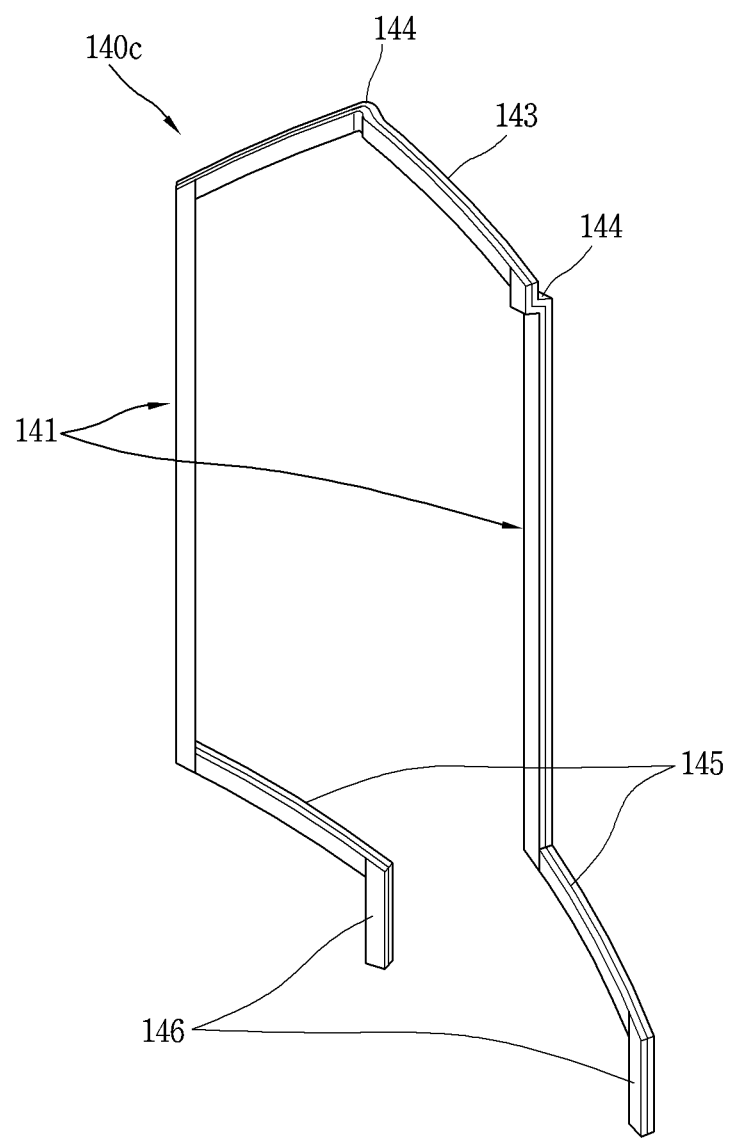
FIG. 7 illustrates an example third segment conductor of an example stator of a rotating electric apparatus or rotary electric machine.

FIG. 4 illustrates a state before bending an extension portion of a segment conductor of FIG. 1; FIG. 5 illustrates a first segment conductor of FIG. 1; FIG. 6 illustrates a second segment conductor of FIG. 1; and FIG. 7 illustrates a third segment conductor of FIG. 1.

As illustrated in FIG. 4, each segment conductor 140 may include two insertion portions 141 spaced apart from each other by 6 slot pitches and inserted into the plurality of slots 116, respectively, a connecting portion 143 for connecting the two insertion portions 141, and two extension portions 145 extending from end portions of the two insertion portions 141, respectively, in a bending manner to be inclined to correspond to 3 slot pitches.

Each segment conductor 140 may be formed by bending a conductor, which is long enough to form the two insertion portions 141, the connecting portion 143, and the two extension portions 145, into a shape like "U".

Each of the segment conductors 140 may include, for example, an insulating layer 147 (insulating film) provided on an outer surface thereof for insulation.

Meanwhile, as illustrated in FIG. 5, the first segment conductor 140a may be configured such that the extension portions 145 are bent along the first direction, for example.

For example, as illustrated in FIG. 6, the second segment conductor 140b may be configured such that the extension portions 145 are selectively bent in the first direction or the second direction depending on a position to be arranged.

In addition, the connecting portion 143 of the second segment conductor 140b may be provided with bent portions 144 that are bent to correspond to a difference in layer between two conductors.

In addition, the third segment conductor 140c may be configured so that the extension portions 145 are bent in the second direction, for example, as illustrated in FIG. 7.

The extension portions 145 of the segment conductor 140 have bent end portions 146, respectively, bent to be disposed in an axial direction.

Each of the bent end portions 146 of the segment conductor 140 may be provided with a cutout portion 148 formed by removing the insulating layer 147 by a preset length. The cutout portion 148 may allow the segment conductor 140 to be connected so that a current can flow.

As a result, the segment conductors 140 can be electrically connected to each other by contact between the cutout portions 148 from which the insulating layer 147 is removed.

The cutout portions 148 in contact with each other may be fixedly coupled in a welding manner.

Figure 8:
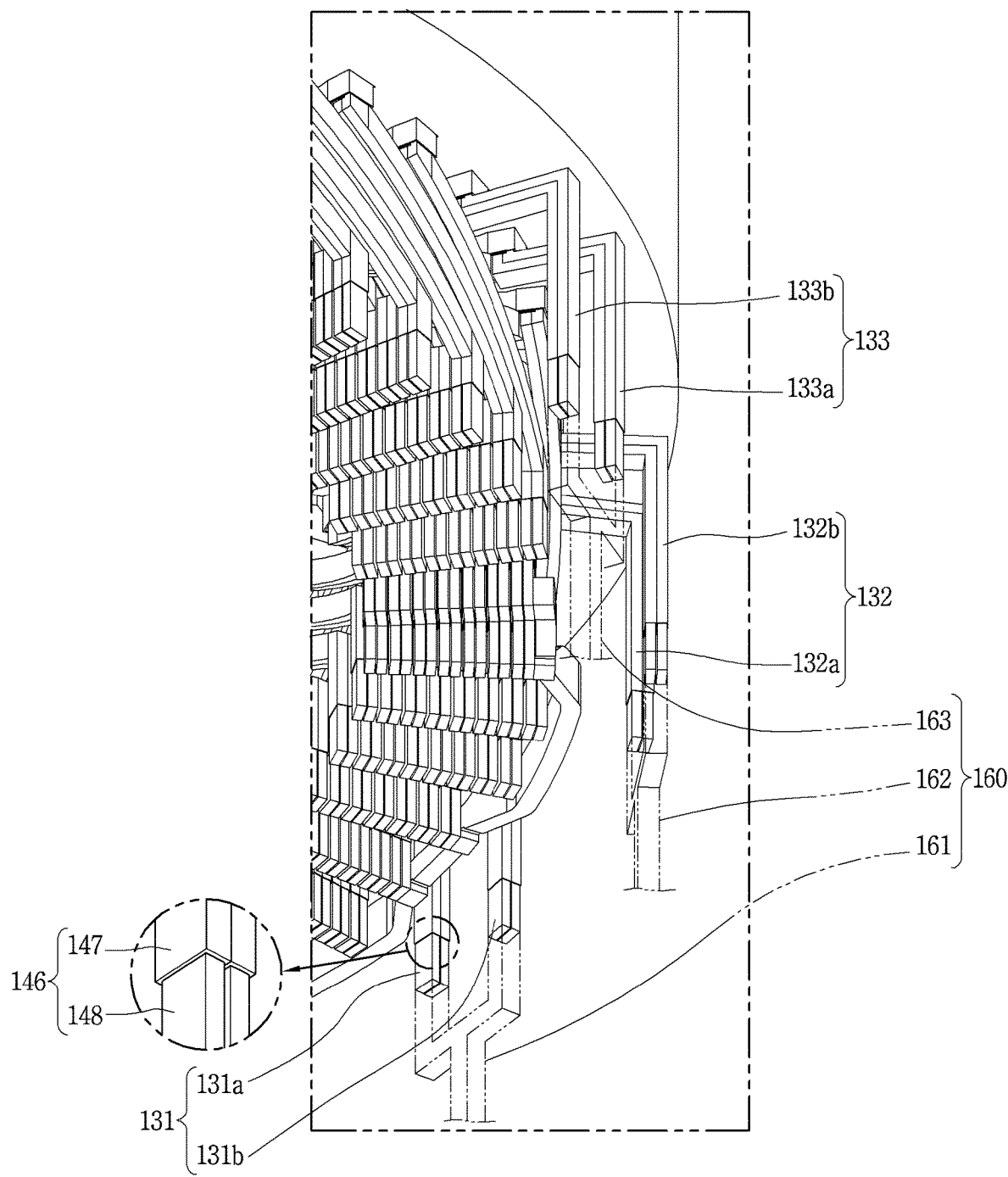
FIG. 8 illustrates an example main part of a bottom perspective view of an example stator of a rotating electric apparatus or rotary electric machine.
Figure 9:
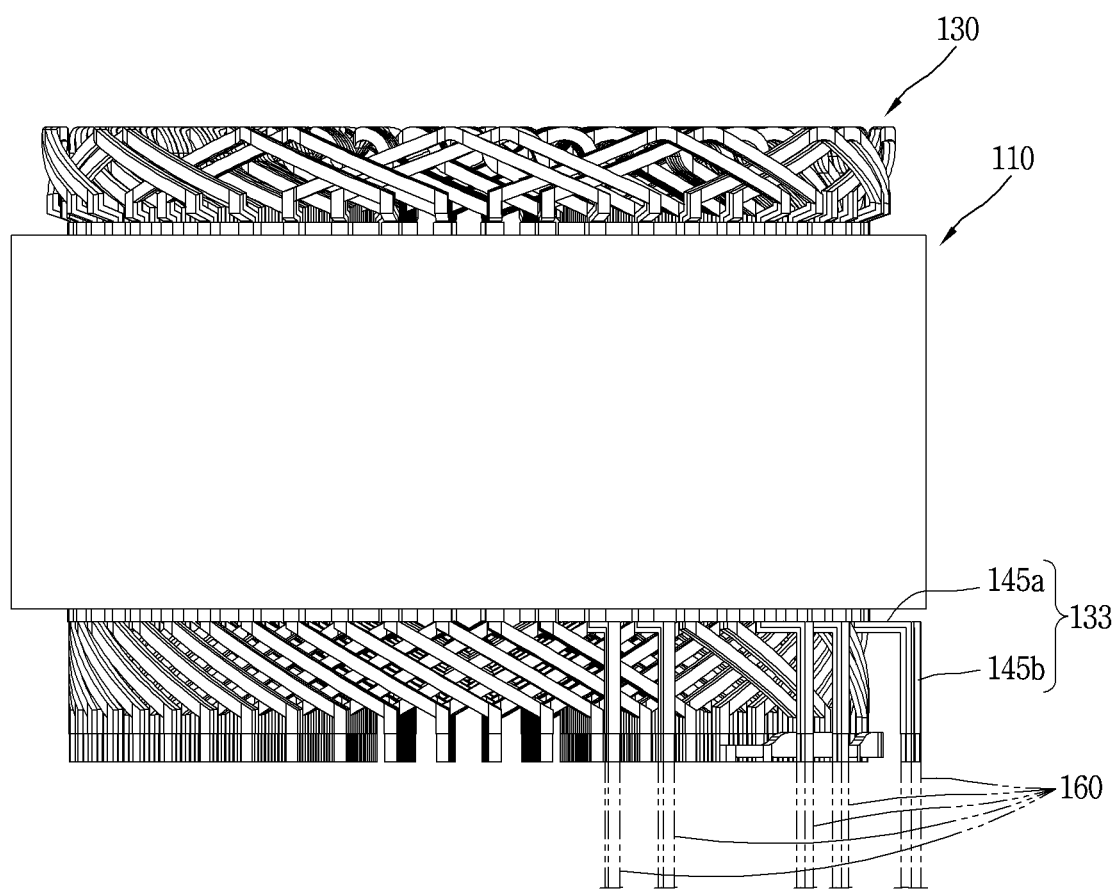
FIG. 9 is a lateral view of a bottom perspective view of an example stator of a rotating electric apparatus or rotary electric machine.
Figure 10:
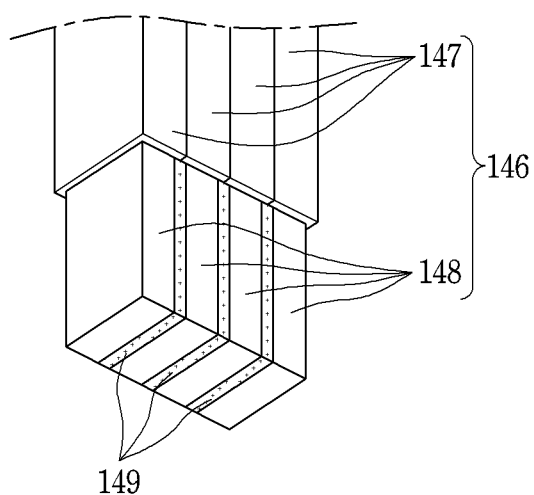
FIG. 10 is an enlarged view of a welded portion of an example main part of an example stator of a rotating electric apparatus or rotary electric machine.

FIG. 8 is an enlarged view of a main part of the stator of FIG. 3; FIG. 9 is a lateral view of FIG. 3; and FIG. 10 is an enlarged view of a welded portion of FIG. 8.

As illustrated in FIG. 8, the first conductor of each of the first phase coil 131, the second phase coil 132, and the third phase coil 133 may be bent to outside of the stator core 10 to be connected to the power line 160.

More specifically, each extension portion 145 of the first conductor of each of the first partial U-phase coil 131a, the second partial U-phase coil 131b, the first partial V-phase coil 132a, the second partial V-phase coil 132b, and the first partial W-phase coil 133a and the second partial W-phase coil 133b, for example, may be provided with a horizontal bent section 145a externally bent in a radial direction of the stator core 110, and a vertical bent section 145b bent from the horizontal bent section 145a to be disposed in the axial direction.

For example, as illustrated in FIG. 9, each horizontal bent section 145a may have a length which makes the vertical bent section 145b disposed more inward than an outer surface (outer edge) of the stator core 110 in the radial direction of the stator core 110.

As a result, the size of the stator can be suppressed from increasing outward along the radial direction of the stator.

Meanwhile, as illustrated in FIG. 10, since each of the segment conductors 140 is formed with two wires (two conductors) in the integral form, actually four conductors are simultaneously welded upon welding for serial connection of two different conductors. Accordingly, welded portions 149 may be formed around the cutout portions 148 of the four conductors.

Hereinafter, a plurality of phase coils of a stator of a rotary electric machine will be described with reference to FIGS. 11 to 18.

Figure 11:
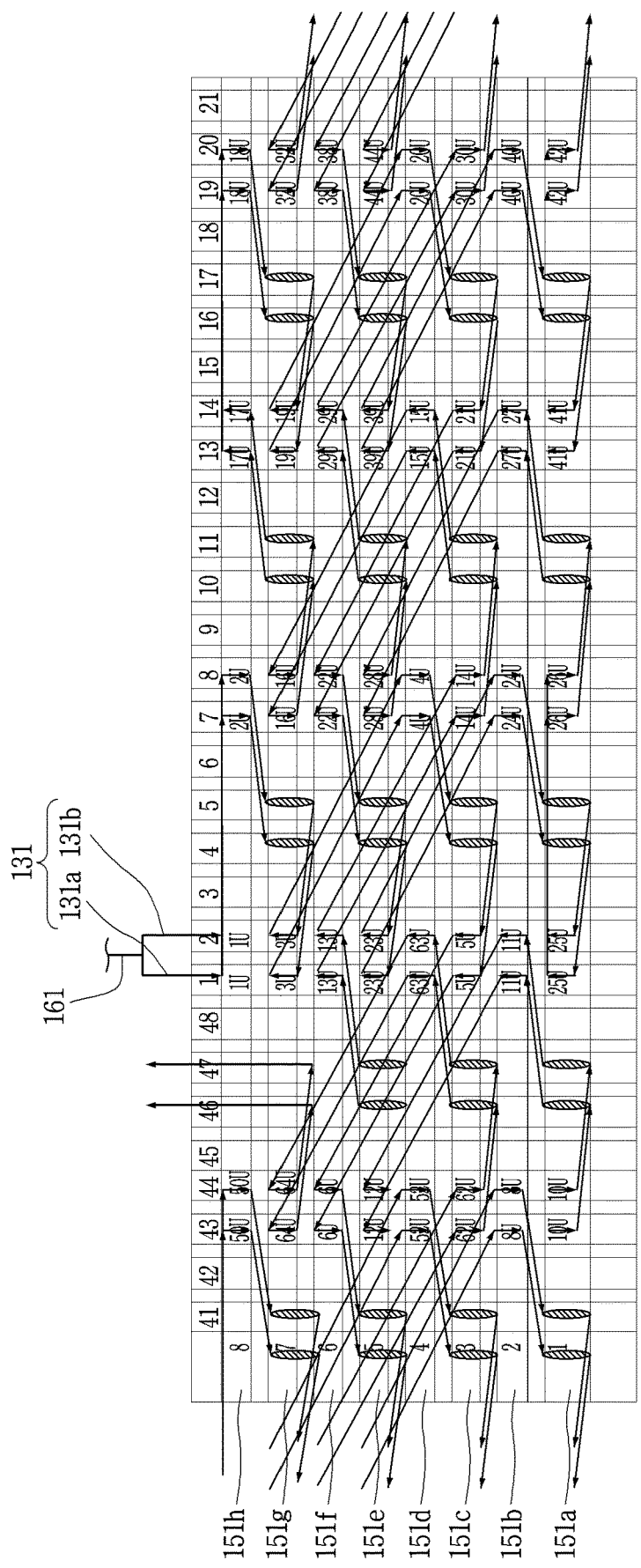
FIGS. 11 and 12 illustrate connected states of an example first phase coil of a bottom perspective view of an example stator of a rotating electric apparatus or rotary electric machine.
Figure 12:
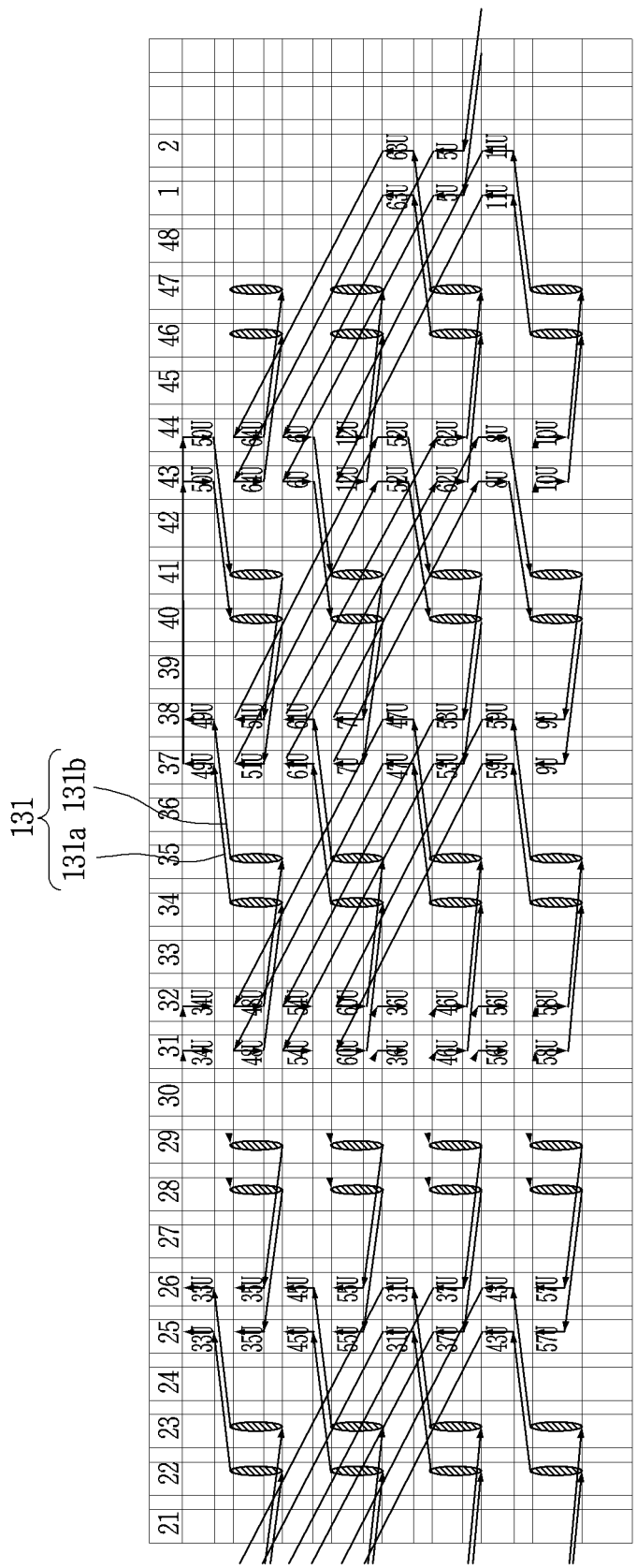

FIGS. 11 and 12 illustrate the connected state of the first phase coil of FIG. 3.

As illustrated in FIGS. 11 and 12, the first phase coil 131 may include a first partial U-phase coil 131a and a second partial U-phase coil 131b.

As described above, the stator core 110 has the 48 slots 116, and the eight conductors (the insertion portions 141 of the segment conductors 140) are inserted into each slot 116 so that first to eighth layers 151a to 151h are formed along the radial direction.

Each of the conductors 140 (the insertion portions 141 of each segment conductor) may be configured by two lines in an integral form.

Each of the first partial U-phase coil 131a and the second partial U-phase coil 131b of the first phase coil 131 may be, for example, spaced apart from each other by 6 slot pitches along the circumferential direction (the first direction, the second direction) of the stator core 110, and may be provided with first to 64th conductors 1U to 64U which are connected in series.

Here, the first conductor 1U refers to a conductor (the insertion portions 141 of the segment conductor 140), into which a current is first introduced in a flowing direction of the current, when the current is applied through the power line 160.

Each of the first partial U-phase coil 131a and the second partial U-phase coil 131b of the first phase coil 131 may have, for example, a plurality of unit patterns, which are spaced from one another along the circumferential direction of the stator core 110 and connected in series.

The plurality of unit patterns may include, for example, 16 conductors spaced apart from one another by 6 slot pitches and connected in series.

In some implementations, since each of the first partial U-phase coil 131a and the second partial U-phase coil 131b of the first phase coil 131 includes 64 conductors, the plurality of unit patterns may include a first unit pattern, a second unit pattern, a third unit pattern, and a fourth unit pattern.

This implementation illustrates the case where the stator core 110 is implemented with the 48 slots 116 and each of the partial phase coils has four unit patterns, but this is merely illustrative. The number of unit patterns may be appropriately adjusted depending on the number of slots 116.

The first partial U-phase coil 131a and the second partial U-phase coil 131b are wound in the same winding manner. Thus, the first partial U-phase coil 131a will be exemplarily described below.

Since the first unit pattern of the first partial U-phase coil 131a is a first unit pattern when a current is applied (introduced) through the power line 160, the first conductor 1U may be connected to the power line 160.

The first conductor 1U may be inserted into, for example, a first slot of the plurality of slots 116 of the stator core 110.

Here, the first conductor 1U of the first unit pattern of the first partial U-phase coil 131a is exemplarily illustrated as being inserted into the first slot of the stator core 110 for convenience of description, but this is merely illustrative, and may alternatively be inserted into another slot 116.

The first conductor 1U may be disposed on the eighth layer 151h which is located at the outermost side in the first slot.

The second conductor 2U connected to the first conductor 1U may be inserted into a seventh slot, which is spaced apart from the first conductor 1U by 6 slot pitches in the first direction.

The second conductor 2U may be disposed on the eighth layer 151h which is located at the outermost side in the seventh slot.

The first conductor 1U and the second conductor 2U configure the segment conductor 140 connected by the connecting portion 143.

As aforementioned, each of the extension portions 145 of the first conductor 1U may include the horizontal bent section 145a outwardly bent along the radial direction of the stator core 110, and the vertical bent section 145b bent from the horizontal bent section 145a along the axial direction.

The vertical bent section 145b may be connected to the power line 160 as described above.

The third conductor 3U connected to the second conductor 2U may be disposed on the seventh layer 151g in the first conductor 1U.

The extension portion 145 of the second conductor 2U may be bent in the second direction in the drawing and the extension portion 145 of the third conductor 3U may be bent in the first direction in the drawing, so as to be welded to each other.

The fourth conductor 4U connected to the third conductor 3U by the connecting portion 143 may be disposed at an inner side of the second conductor 2U.

The fourth conductor 4U may be disposed on the fourth layer 151d in the seventh slot.

The fifth conductor 5U connected to the fourth conductor 4U may be disposed at an inner side of the first conductor 1U.

The fifth conductor 5U may be disposed on the third layer 151c in the first slot.

The sixth conductor 6U connected to the fifth conductor 5U by the connecting portion 143 may be inserted into the 43$^{rd}$ slot spaced apart by 6 slot pitches along the second direction.

The sixth conductor 6U may be disposed on the sixth layer 151f in the 43$^{rd}$ slot.

The seventh conductor 7U connected to the sixth conductor 6U may be inserted into the 37$^{th}$ slot spaced apart by 6 slot pitches along the second direction.

The seventh conductor 7U may be disposed on the fifth layer 151e in the 37$^{th}$ slot.

The eighth conductor 8U connected to the seventh conductor 7U by the connecting portion 143 may be disposed on the second layer 151b in the 43th slot spaced apart in the first direction.

The ninth conductor 9U connected to the eighth conductor 8U may be disposed at an inner side of the seventh conductor 7U.

The ninth conductor 9U may be disposed on the first layer 151a in the 37$^{th}$ slot.

The tenth conductor 10U forming the segment conductor 140 together with the ninth conductor 9U may be disposed on the first layer 151a in the 43$^{rd}$ slot.

The eleventh conductor 11U connected to the tenth conductor 10U may be disposed on the second layer 151b in the first conductor 1U.

The twelfth conductor 12U forming the segment conductor 140 together with the eleventh conductor 11U may be disposed at an inner side of the sixth conductor 6U.

The twelfth conductor 12U may be disposed on the fifth layer 151e in the 43$^{rd}$ slot.

The thirteenth conductor 13U connected to the twelfth conductor 12U may be disposed at an inner side of the first conductor 1U.

The thirteenth conductor 13U may be disposed on the sixth layer 151f in the first slot.

The fourteenth conductor 14U forming the segment conductor 140 together with the thirteenth conductor 13U may be disposed at an inner side of the second conductor 2U.

The fourteenth conductor 14U may be disposed on the third layer 151c in the seventh slot.

The fifteenth conductor 15U connected to the fourteenth conductor 14U may be disposed on the fourth layer 151d in the thirteenth slot spaced apart from the fourteenth conductor 14U along the first direction.

The sixteenth conductor 16U forming the segment conductor 140 together with the fifteenth conductor 15U may be disposed at an inner side of the second conductor 2U.

The sixteenth conductor 16U may be disposed on the seventh layer 151g in the seventh slot.

The second unit pattern, for example, may be spaced apart from the first unit pattern by 12 slot pitches along the first direction.

The second unit pattern may include seventeenth to 32$^{nd}$ conductors 17U to 32U connected in series with being spaced apart by 6 slot pitches.

The seventeenth conductor 17U, which is the first conductor of the second unit pattern, may be connected to the sixteenth conductor 16U, which is the last conductor of the first unit pattern.

The seventeenth conductor 17U may be inserted into, for example, a thirteenth slot spaced apart from the first slot by 12 slot pitches along the first direction.

The seventeenth conductor 17U may be disposed on the eighth layer 151h in the thirteenth slot.

Similar to this, the eighteenth conductor 18U may be disposed on the eighth layer 151h in the nineteenth slot 19U spaced apart from the seventeenth conductor 17U by 6 slot pitches along the first direction.

In other words, the eighteenth conductor 18U may be disposed on the eighth layer 151h in the nineteenth slot spaced apart from the second conductor 2U (the seventh slot) by 12 slot pitches along the first direction.

The 32$^{nd}$ conductor 32U which is the last conductor of the second unit pattern may be disposed on the seventh layer 151g in the nineteenth slot spaced apart from the sixteenth conductor 16U, which is the last conductor of the first unit pattern, by 12 slot pitches along the first direction.

The third unit pattern connected to the second unit pattern may include $33^{rd}$ to $48^{th}$ conductors 33U to 48U spaced apart from the $17^{th}$ to $32^{nd}$ conductors 17U to 32U of the second unit pattern by 12 slot pitches along the first direction.

For reference, the $33^{rd}$ conductor 33U, which is the first conductor of the third unit pattern, may be disposed on the eighth layer 151h in the $25^{th}$ slot spaced apart from the first conductor 1U by 24 slot pitches.

The $48^{th}$ conductor 48U, which is the last conductor of the third unit pattern, may be disposed on the seventh layer 151g in the $31^{st}$ slot spaced apart from the $16^{th}$ conductor 16U by 24 slot pitches along the first direction.

The fourth unit pattern connected to the third unit pattern may include $49^{th}$ to $64^{th}$ conductors 49U to 64U spaced apart from the $33^{rd}$ to $48^{th}$ conductors 33U to 48U by 12 slot pitches along the first direction.

The $49^{th}$ to $64^{th}$ conductors 49U to 64U of the fourth unit pattern may be spaced apart from the first to $16^{th}$ conductors 1U to 16U of the first unit pattern along the first direction.

For reference, the $49^{th}$ conductor 49U may be disposed on the eighth layer 151h in the $37^{th}$ slot spaced apart from the first conductor 1U (the first slot) by 36 slot pitches.

Since the 64th conductor 64U is spaced apart from the 16th conductor 16U (the seventh slot) by the 36-slot pitch interval, the 64th conductor 64U may be disposed on the seventh layer 151g in the 43rd slot.

As can be seen in the drawing, the first to 64th conductors 1U to 64U of the second partial U-phase coil 131b may be spaced apart from the first to $64^{th}$ conductors 1U to 64U of the first partial U-phase coil 131a by one slot pitch along the first direction.

Figure 13:
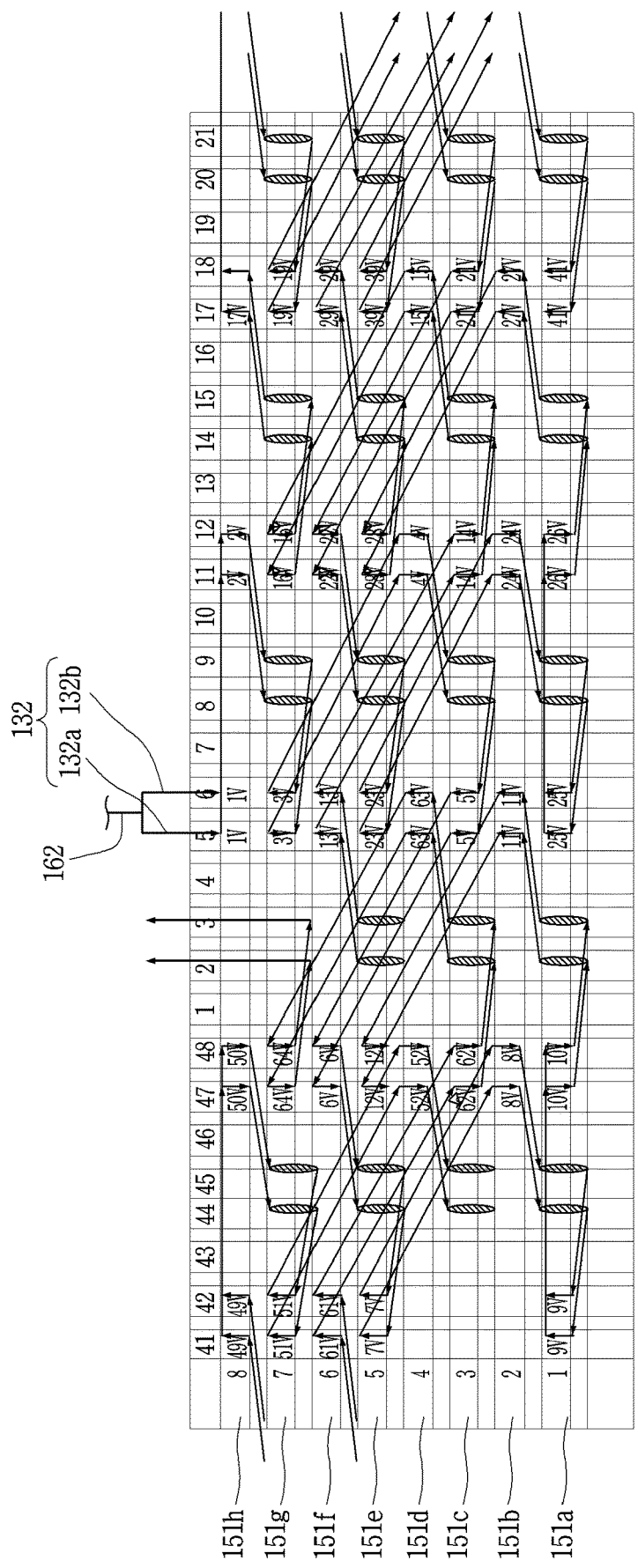
FIGS. 13 and 14 illustrate connected states of an example second phase coil of a bottom perspective view of an example stator of a rotating electric apparatus or rotary electric machine.
Figure 14:
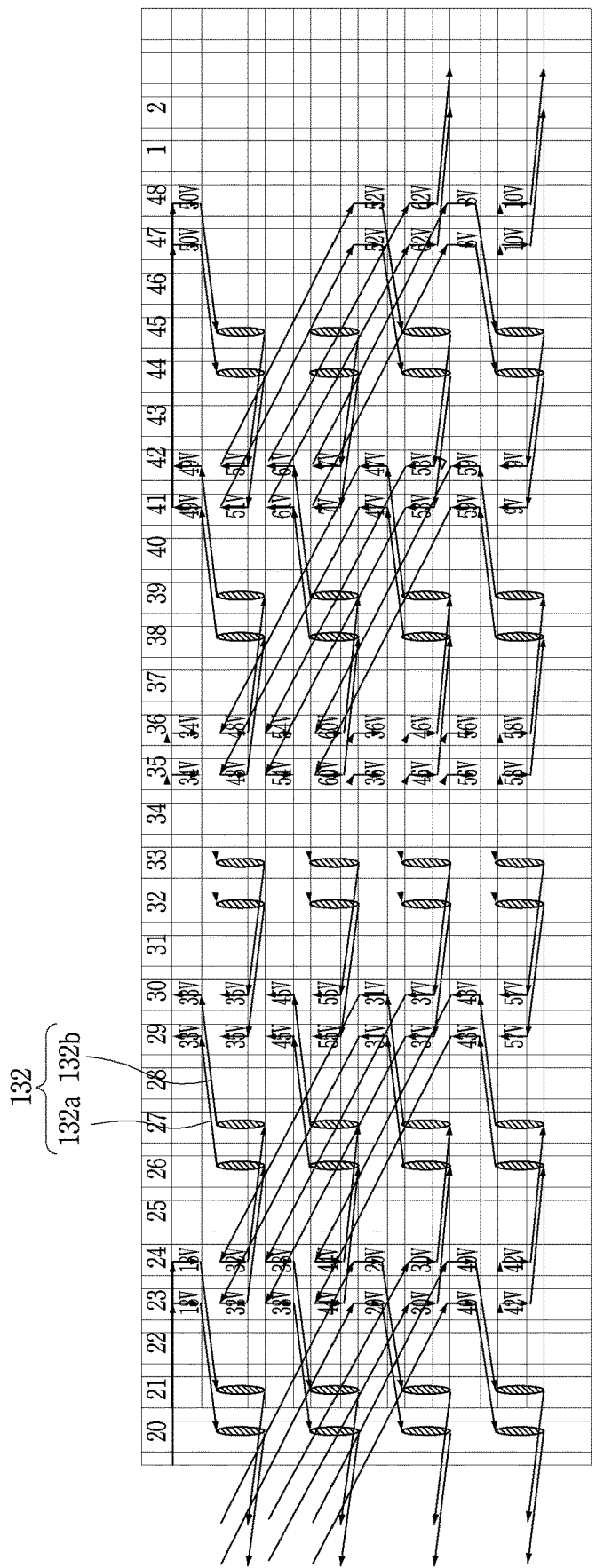
Figure 15:
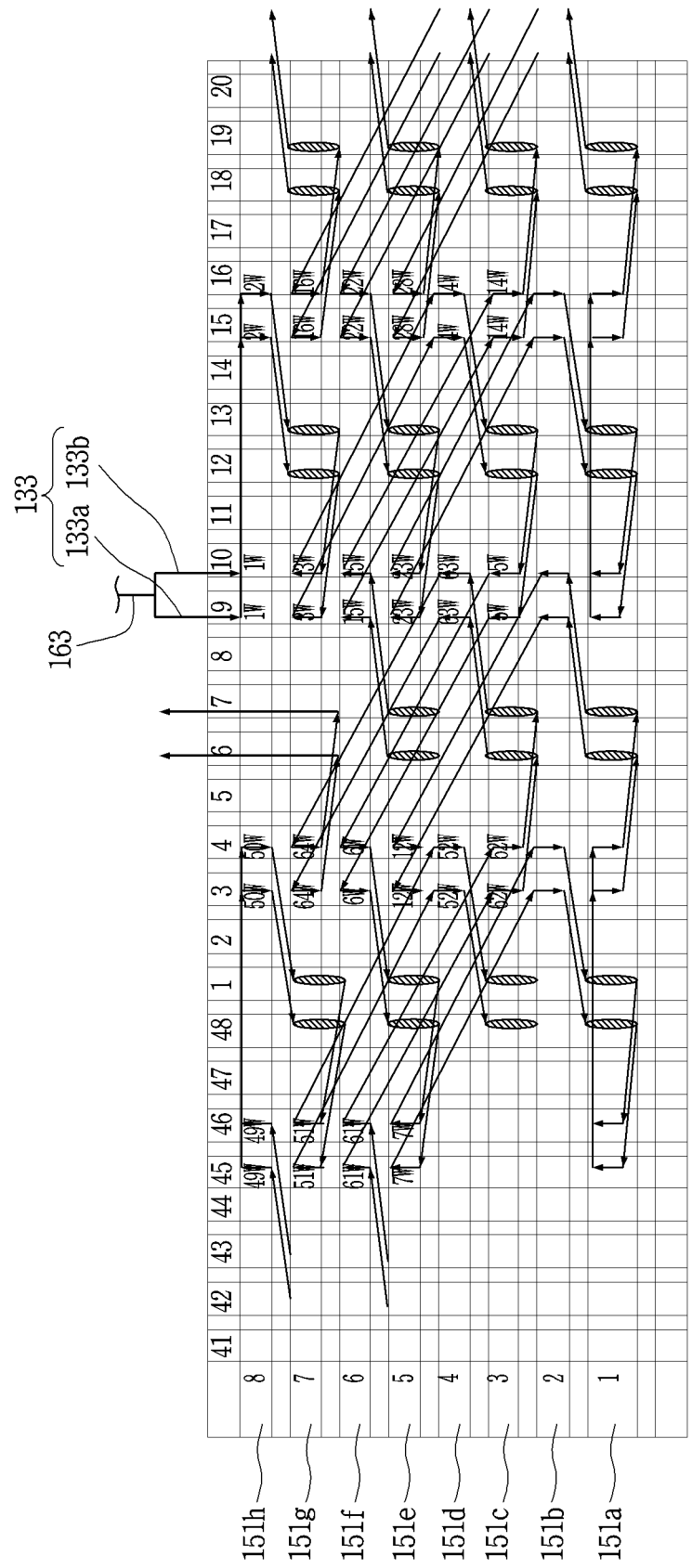
FIGS. 15 and 16 illustrate connected states of an example third phase coil of a bottom perspective view of an example stator of a rotating electric apparatus or rotary electric machine.
Figure 16:
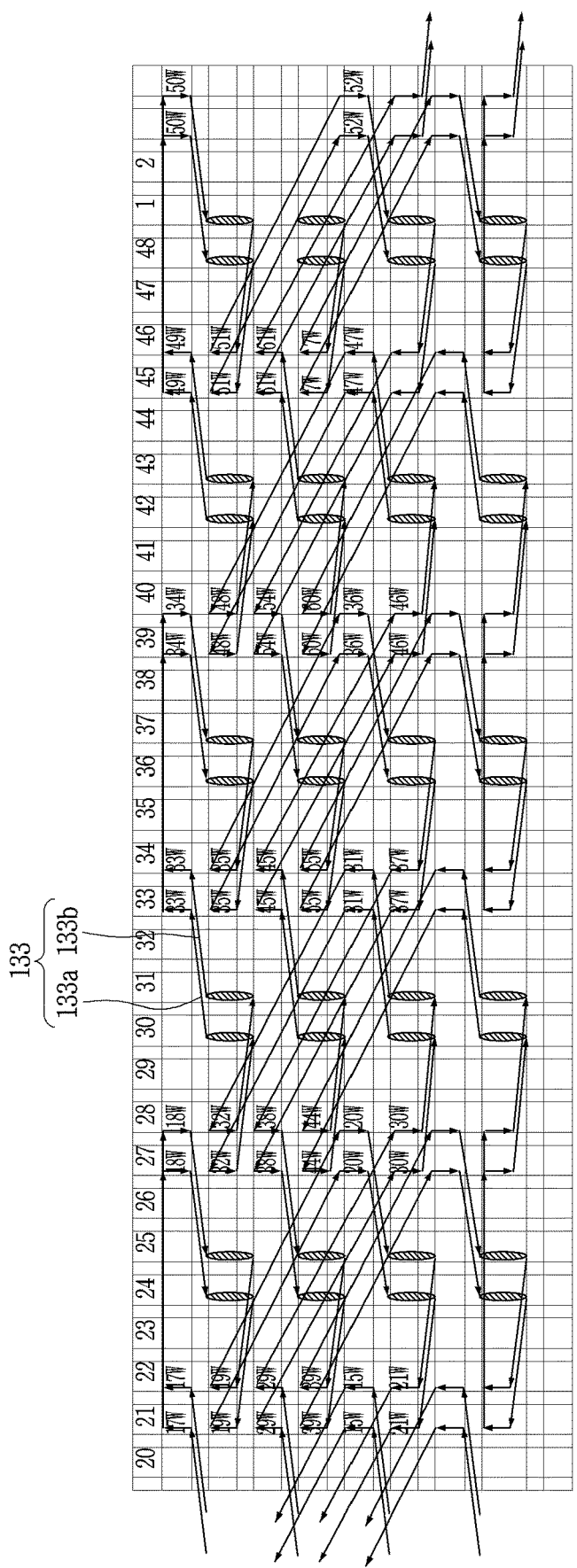

FIGS. 13 and 14 illustrate the connected state of the second phase coil of FIG. 3; FIGS. 15 and 16 illustrate the connected state of the third phase coil of FIG. 3; and FIG. 17 illustrates a state where each conductor of the first phase coil, the second phase coil and the third phase coil of FIG. 3 is inserted into a corresponding slot.

As illustrated in FIGS. 13 and 14, each of the first partial V-phase coil 132a and the second partial V-phase coil 132b of the second phase coil 132 may include first to $64^{th}$ conductors 1V to 64V spaced apart from one another by 6 slot pitches and connected in series.

Each of the first partial V-phase coil 132a and the second partial V-phase coil 132b of the second phase coil 132 may include first to fourth unit patterns.

The first to $64^{th}$ conductors 1V to 64V of the first partial V-phase coil 132a of the second phase coil 132 may be spaced apart from the first to $64^{th}$ conductors 1U to 64U of the first partial U-phase coil 131a by 4 slot pitches.

The first to $64^{th}$ conductors 1V to 64V of the second partial V-phase coil 132b of the second phase coil 132 may be spaced apart from the first to $64^{th}$ conductors 1V to 64V of the first partial V-phase coil 132a of the second phase coil 132 by one slot pitch along the first direction.

Also, as illustrated in FIGS. 15 and 14, each of the first partial W-phase coil 133a and the second partial W-phase coil 133b of the third phase coil 133 may include first to $64^{th}$ conductors 1W to 64W spaced apart from one another by 6 slot pitches and connected in series.

Each of the first partial W-phase coil 133a and the second partial W-phase coil 133b of the third phase coil 133 may include first to fourth unit patterns.

The first to $64^{th}$ conductors 1W to 64W of the first partial W-phase coil 133a of the third phase coil 133 may be spaced apart from the first to $64^{th}$ conductors 1V to 64V of the first partial V-phase coil 132a by 4 slot pitches.

The first to $64^{th}$ conductors 1W to 64W of the second partial W-phase coil 133b of the third phase coil 133 may be spaced apart from the first to $64^{th}$ conductors 1W to 64W of the first partial W-phase coil 133a of the third phase coil 133 by one slot pitch along the first direction.

As described above, the slots and the layers of the first conductor 1U, V, 1W to the $64^{th}$ conductor 64U, 64V, 64W of each of the first phase coil 131 (U-phase), the second phase coil 132 (V-phase), and the third phase coil 133 (W-phase) each having the plurality of unit patterns are illustrated in FIG. 17 in detail.

Meanwhile, the $64^{th}$ conductors 64U, 64V, and 64W, which are the last conductors of the first partial U-phase coil 131a and the second partial U-phase coil 131b of the first phase coil 131, the first partial V-phase coil 132a and the second partial V-phase coil 132b of the second phase coil 132, and the first partial W-phase coil 133a and the second partial W-phase coil 133b of the third phase coil 133 may be connected to the neutral line 170.

Figure 18:
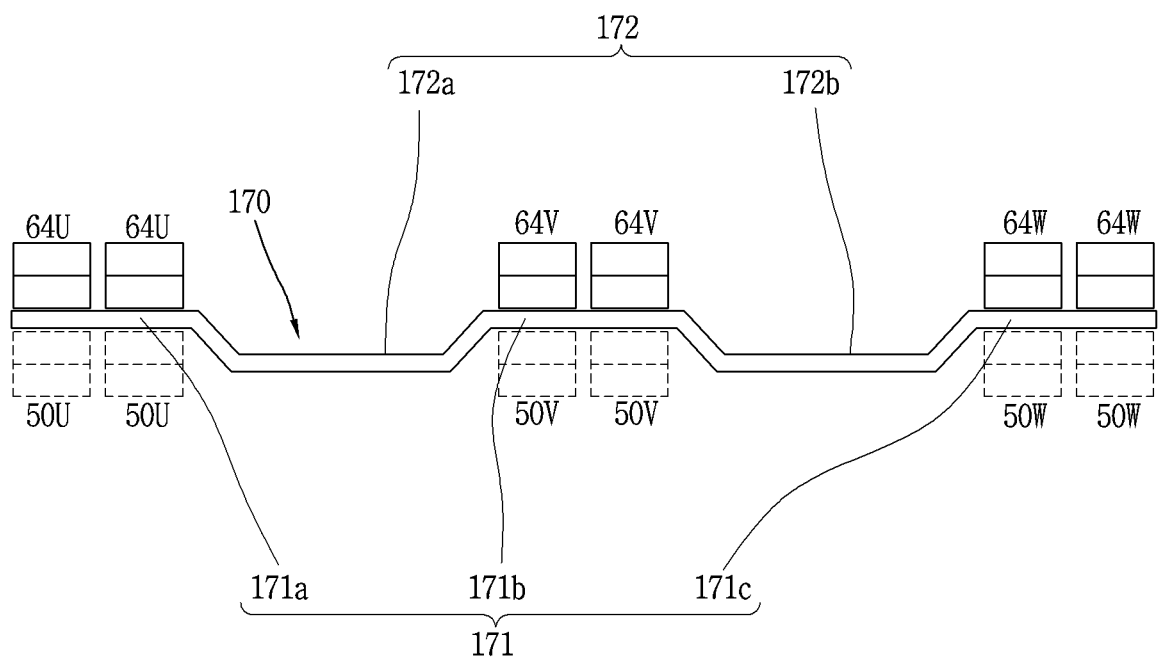
FIG. 18 illustrates a coupled state of a neutral line of a state before bending an extension portion of a segment conductor of an example stator of a rotating electric apparatus or rotary electric machine.

FIG. 18 illustrates a coupled state of a neutral line of FIG. 4.

As illustrated in FIG. 18, the neutral line 170 may include three conductor contact portions 171a, 171b, and 171c brought into contact with the last conductors of the partial phase coils, respectively, and two connecting portions 172a and 172b connecting adjacent two conductor contact portions.

The neutral wire 170 may be formed by bending, for example, a bar-shaped conductor which is long enough to form the three conductor contact portions 171a, 171b, and 171c and the two connecting portions 172a and 172b.

The neutral wire 170 may be configured to be in contact with a side surface of the last conductor of each partial phase coil, for example.

For example, the neutral wire 170 may be configured such that the connecting portions have a more extended width than the conductor contact portions 171a, 171b, and 171c.

Since the last conductors of the respective partial phase coils are spaced by one slot pitch, each of the conductor contact portions 171a, 171b, 171c may have, for example, a length to be contactable with the last two conductors of each partial phase coil.

For example, the connecting portions 172a and 172b may have lengths corresponding to 4 slot pitches because the last conductors of the respective partial phase coils are spaced apart by the 4 slot pitches along the circumferential direction.

The connecting portions 172a and 172b, for example, may be bent to protrude outwards along the radial direction of the stator core 110, so as to prevent contact with other conductors provided between the last conductors of the respective partial phase coils.

With such a configuration, the first segment conductor 140a, the second segment conductor 140b, and the third segment conductor 140c, each in a state where the extension portions 145 are not bent yet, namely, each having a shape like "U" may be inserted into the plurality of slots of the stator core 110, respectively.

The extension portions 145 of each segment conductor 140 may be bent obliquely as the segment conductor 140 is twisted in a preset direction after being inserted into the slot 116.

The segment conductor 140 may be provided with the bent end portion 146 bent from an end portion of each extension portion 145 thereof to be disposed in the axial direction.

Each bent end portion 146 may be provided with the cutout portion 148.

The cutout portions 148 of the bent end portions 146 of each segment conductor 140 may be welded according to the aforementioned unit pattern forming method to be connected in series so that a current can flow.

On the other hand, the first conductor 1U, 1V, 1W of each of the first partial U-phase coil 131a, the second partial U-phase coil 131b, the first partial V-phase coil 132a, the second partial V-phase coil 132b, and the first partial W-phase coil 133a and the second partial W-phase coil 133b, for example, may be provided with a horizontal bent section 145a externally bent in the radial direction of the stator core 110, and a vertical bent section 145b bent from the horizontal bent section 145a to be disposed in the axial direction.

Each of the first conductors 1U, 1V, and 1W of the first phase coil 131, the second phase coil 132, and the third phase coil 133 may be connected to the power line 160 for each phase.

The 64$^{th}$ conductors 64U, 64V, and 64W of the first phase coil 131, the second phase coil 132, and the third phase coil 133 may be welded to the neutral wire 170, respectively.

The welded portions 149 of the segment conductor 140 and the welded portions of the neutral wire 170 may be coated with an insulating material (for example, epoxy resin).

This may result in improving insulation performance of the welded portions 149 of the segment conductor 140 and the welded portions of the neutral wire 170.

The invention claimed is:

1. A stator of a rotating electric apparatus, the stator comprising:
   a stator core that defines a plurality of slots that are located along a circumference of the stator core; and
   a stator coil that includes a plurality of conductors that are electrically connected, that are located in the plurality of slots, and that is configured to conduct electricity,
   wherein the stator coil comprises a plurality of phase coils that are each connected to a phase of a power source,
   wherein a first conductor of the stator coil is connected to a power line and is located in an n$^{th}$ layer that is an outermost layer of one of the plurality of slots,
   wherein an N$^{th}$ conductor of the stator coil is connected to a neutral line and is located in an n-1$^{th}$ layer that is located nearer to a center of the stator than the n$^{th}$ layer, and
   wherein ends of the conductors that are located inside each slot of the plurality of slots are welded together.

2. The stator of claim 1, wherein each conductor of the plurality of phase coils is configured in a two-line integral form.

3. The stator of claim 1, wherein each phase coil of the plurality of phase coils comprises a first partial phase coil and a second partial phase coil connected to each other in parallel.

4. The stator of claim 3, wherein the first partial phase coil and the second partial phase coil are spaced apart from each other by one slot pitch along the circumference of the stator core.

5. The stator of claim 3, wherein a conductor, connected to the power line, of each of the first partial phase coil and the second partial phase coil includes (i) a horizontal bent section that is bent along a radial direction of the stator core, and (ii) a vertical bent section that is bent from the horizontal bent section and that extends in an axial direction.

6. The stator of claim 5, wherein the vertical bent section is located closer to a center of the stator core than an outer edge of the stator core and is oriented along the radial direction of the stator core.

7. The stator of claim 5, wherein:
   each phase coil of the plurality of phase coils comprises a first phase coil, a second phase coil, and a third phase coil,
   the neutral line is located at an inner side of the vertical bent section along the radial direction of the stator core,
   the neutral line includes (i) three conductor contact portions that contact respective conductors of the plurality of phase coils and (ii) two connecting portions that each connect to one of two conductor contact portions that are adjacent to each other, and
   the connecting portions protrude externally from the conductor contact portions along the radial direction of the stator core.

8. The stator of claim 1, wherein the first conductor and the N$^{th}$ conductor of each phase coil of the plurality of phase coils are connected to the neutral line and are spaced apart from each other by six slot pitches.

9. The stator of claim 1, wherein welded portions of the neutral line and the conductors are coated with an insulating material.

10. The stator of claim 1, wherein each of the plurality of phase coils comprises a plurality of segment conductors that each include:
    a first insertion portion and a second insertion portion that are located in the plurality of slots and that are spaced apart from each other by six slot pitches;
    a connecting portion that electrically connects a first end of the first insertion portion to a first end of the second insertion portion; and
    two extension portions extending from second ends of a respective one of the first and second insertion portions by a length corresponding to three slot pitches.

11. The stator of claim 1, wherein:
    each of the plurality of phase coils comprises a plurality of unit patterns spaced apart from one another along the circumference of the stator core and connected in series,
    the plurality of unit patterns comprises the first conductor to an m$^{th}$ conductor that are spaced apart by six slot pitches and connected in series,
    the first conductor of a first unit pattern of the plurality of unit patterns is connected to the power line,
    the first conductor of each of a second unit pattern to a last unit pattern of the plurality of unit patterns is connected to the m$^{th}$ conductor, which is a last conductor of a preceding unit pattern, and
    the last m$^{th}$ conductor of the last unit pattern of the plurality of unit patterns is connected to the neutral line.

12. The stator of claim 11, wherein:
    the plurality of slots includes eight respective layers along the radial direction of the stator core, and
    each of the plurality of unit patterns includes the first conductor and second to sixteenth conductors.

13. The stator of claim 12, wherein, for each of the plurality of unit patterns:
    the first conductor located on an eighth layer in any one of the plurality of slots,
    a second conductor is located on an eighth layer in a slot spaced apart from the first conductor in a first direction,
    a third conductor is located on a seventh layer in the first conductor, a fourth conductor is located on a fourth layer in the second conductor, a fifth conductor is located on a third layer in the first conductor, a sixth conductor is located on a sixth layer in a slot spaced apart from the fifth conductor in a second direction opposite to the first direction, a seventh conductor is located on a fifth layer in a slot spaced apart from the sixth conductor in the second direction, an eighth conductor is located on a second layer in the sixth conductor, a ninth conductor is located on a first layer in the seventh conductor, a tenth conductor is located on a first layer in the eighth conductor, an eleventh conductor is located on a second layer in the first conductor, a twelfth conductor is located on a fifth layer in the sixth conductor, a thirteenth conductor is located on a sixth layer in the first conductor, a fourteenth conductor is located on a third layer in the second conductor, a fifteenth conductor is located on a fourth layer in a slot spaced apart from the fourteenth conductor in the first direction, and a sixteenth conductor is located on a seventh layer in the second conductor.

14. The stator of claim 13, wherein the plurality of unit patterns is spaced apart from each another by twelve slot pitches in the first direction.

15. The stator of claim 13, comprising:

48 slots in the plurality of slots; and 4 unit patterns in the plurality of unit patterns.

* * * * *